United States Patent Office 3,329,531
Patented July 4, 1967

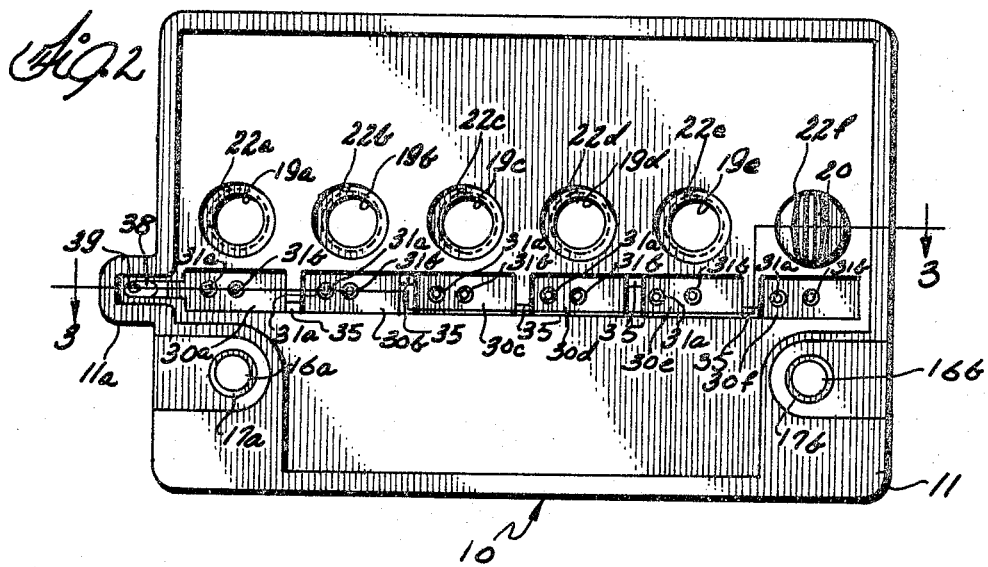

3,329,531
BATTERY CASING AND COVER THEREFOR
Roy Erving Hennen, Mequon, Wis., assignor to Globe-Union Inc., Milwaukee, Wis., a corporation of Delaware
Filed Dec. 14, 1964, Ser. No. 418,350
20 Claims. (Cl. 136—177)

ABSTRACT OF THE DISCLOSURE

A battery including a cover sealed on a casing and including a manifold venting system formed in the outer surface of the cover by virtue of a cavity for each cell and small connecting channels. The cavities and channels are closed by a pressure sensitive thin plastic film covering the outer surface of the cover providing a smooth appearance and fluid tight manifold. The cover receives recessed vent caps having thin flexible threaded walls slightly larger than the vent ports to provide a liquid tight seal without the use of gaskets.

---

The present invention relates to casings for storage batteries and especially for batteries adapted for use on motorcycles and other automotive applications, where it is desirable to vent corrosive fumes from the battery to an area remote from the battery.

One problem sometimes encountered in motorcycle batteries concerns the venting of gases generated in the cells of the battery to the atmosphere. While in an ordinary automotive battery, the caps which close the filling apertures of the battery are normally provided with small vent holes or vent passageways for venting these gases to the immediate vicinity of the battery, this is not satisfactory for motorcycle application. A motorcycle battery is commonly located in the proximity of the legs of the cyclist or near the chrome finish of the motorcycle, and it is therefore desirable that any corrosive fumes or liquid which is discharged in the venting process be diverted from contact with the cyclist's body or clothing, and also away from contact with the various parts of the motorcycle, which may be damaged thereby.

A similar problem is encountered in some automotive applications. For example, some automobile manufacturers are experimenting with the idea of locating automobile batteries in the trunk proper. In such applications, the gases generated by the battery must be vented to the atmosphere externally of the vehicle to avoid contaminating the interior of the car and adversely affecting its occupants. Additionally, in rear engine automobiles, the engine chamber is not ventilated to the same extent as the engine chamber of front engine automobiles. Consequently, it is likewise desirable to vent gases generated by the battery to the atmosphere externally of the vehicle to prevent possible corrosive actions and possible accumulations of dangerous gases.

Several ways of accomplishing this venting have been known in the prior art, which involve interconnecting the various cells of the battery with a tube or like extension which runs from the battery to the remote location. These constructions are relatively complicated and expensive, however, and it is desirable to provide ways in which the cost and complexity of such batteries may be reduced.

Accordingly, it is a principal object of this invention to provide a battery adapted to be vented to a remote location, which battery is relatively simple and inexpensive.

Another object of the present invention is to provide such a battery in which the venting means is disposed within the cover of the battery casing.

A further object of the present invention is to provide a battery construction having an integrally molded battery cover including a vent chamber for each of the cells of the battery formed in the outer surface of the cover, and means closing all of said vent chambers and defining interconnecting passageways therebetween.

It is another object of this invention to provide an improved manifold vent for a storage battery which results in simplified manufacture, a more aesthetic appearance, and enhanced operation.

An additional object is to provide a battery construction having an integrally molded battery cover wherein filler ports are provided which are recessed so that filler caps are received in the recesses and a flush cover is provided having no upstanding projections or obstructions. A related object is to provide a filler port design which eliminates the need for filler cap sealing gaskets. More specifically, an object is to provide filler ports which cause relatively soft filler caps to be deformed to provide a positive seal when inserted therein.

These and other objects and advantages of the present invention will become manifest upon an examination of this description and of the accompanying claims and drawing.

In one embodiment of the present invention, a battery is provided with an integrally molded cover member having a vent chamber for each of the cells of the battery, each vent chamber having a pair of ports communicating with the associated cell. The chambers of the cover member open outwardly and are all closed by a single, relatively thin, pressure-sensitive cover sheet overlying at least a portion of the cover member. The chambers are interconnected with channels or passageways disposed in staggered relationship, and one endmost vent chamber is connected with a tube extending to a remote location. Additionally, the cover member is provided with recessed filler ports adapted to receive filler caps so that a flush cover is provided even after the filler caps have been inserted in the filler ports.

This construction provides a cover having an intricate arrangement of chambers and passageways, but one which is relatively inexpensive and easy to manufacture, being comprised of only two component parts as far as the venting mechanism is concerned, namely, the cover member and the cover sheet.

In a preferred form of the invention, an inner cover sheet overlies the chambers, the channel or passageways and the immediately adjacent cover area. When desired, an outer cover sheet is utilized which overlies substantially the entire outer surface of the cover member and thus provides a smooth, aesthetic appearance for the battery, protects various electrical connections from exposure to acid fumes or possible short circuits, and facilitates cleaning and maintenance.

Reference will now be made to the accompanying drawing in which:

FIGURE 1 is a perspective view of a storage battery constructed in accordance with this invention;

FIG. 2 is a plan view of a battery embodying the present invention with its cover sheet removed;

FIG. 3 is a vertical cross-sectional view, partially broken away, taken along the line 3—3 of FIG. 2, but with the cover sheet in place; and FIG. 4 is a partially broken away perspective view of a filler cap employed in the present storage battery.

While the invention has been shown and will be described in some detail with reference to a particular, exemplary embodiment thereof, there is no intention to limit the invention to such detail. Quite to the contrary, it is intended here to embrace all modifications, alternatives and equivalents falling within the spirit and scope of the invention as defined by the appended claims. For the purpose of the ensuing description, it will be assumed the invention is incorporated in a battery for a motorcycle having undercover intercell connections. However, it will be readily apparent that the invention may likewise be incorporated in a battery utilized in any automotive application and in a battery having overcover intercell connections.

Referring now to the drawing and more particularly to FIG. 1, a storage battery 10 is illustrated which incorporates the features of the present invention. A cover member 11 of the type now generally known as a one-piece cover is secured to battery casing body 12, the cover member being disclosed in general rectangular form. The cover member 11 has a unique formation in its outer surface to define various functional portions of the battery, and a cover sheet 13, which improves the overall appearance of the battery and which is preferably formed of a plastic material with a pressure-sensitive adhesive on one surface thereof, is secured to the cover 11 and cooperates therewith to define a manifold vent system. Additionally, in the event a battery having overcover intercell connections is employed, the cover sheet 13 cooperates with the cover 11 to protect such connections. For the purpose of venting the battery 10 to a remote location, a vent tube 15 is provided which is coupled to the manifold vent system within a protective flange 11a extending outwardly from the edge of the cover 11. The cover sheet 13 is provided with a corresponding tab 13a that covers and seals a channel defined within the flange 11a.

Referring to FIGS. 1–3, it may be seen that the cover 11 is recessed to receive the cover sheet 13 and is also recessed at two locations to receive terminal leads 18a and 18b which extend outwardly from the battery. The terminal leads 18a and 18b are suitably secured to terminal posts 16a and 16b and, in the exemplary arrangement, lead bushings 17a and 17b are provided for sealing the cover 11 where the terminal posts pass through.

For the purpose of allowing for the addition of distilled water to the battery cells when necessary, a plurality of circular apertures or filler ports 19a–19f are provided in the cover 11, one filler port being provided for each battery cell. Since the battery 10 is illustrated as having six cells, six filler ports have been provided in the cover 11. The filler ports 19a–19f are threaded and are thereby adapted to receive threaded filler caps 20. Referring to FIG. 4, an exploded, partially cut-away perspective view of an exemplary filler cap 20 is shown. As may be seen, the filler cap includes a threaded, annular lower portion 20a which is adapted to be received by a filler port, a disc-like central portion 20b which is adapted to engage the top of a battery cover and a pair of upwardly extending projections 20c and 20d which are adapted to be manually grasped so that the filler cap may be rotated whereby it may be threaded into or unthreaded from a filler port.

In accordance with an aspect of the present invention, the filler caps and the filler ports are designed so that the need for filler cap sealing gaskets is eliminated. For this purpose, the filler ports 19a–19f are tapered outwardly from the tops thereof toward the bottoms thereof, see filler port 19f in FIG. 3. Additionally, the top of each filler port is designed to have a smaller circular cross section than the annular portion 20a of the filler caps 20. Finally the filler caps 20 are formed of a soft, readily deformable material, such as polyethylene. Consequently, when filler caps 20 are threaded into the filler ports 19a–19f, the filler caps are deformed to provide a positive seal so that sealing gaskets are not required. To aid in such positive sealing, annular ridges 21 are formed in the cover 11 coaxially with the filler ports 19a–19f (see FIG. 3). The annular ridges 21 communicate with the bottoms of the disc-like central portions 20b of the filler caps 20 to aid in forming a positive seal when the filler caps are threaded into the filler ports.

In accordance with another aspect of the present invention, the cover 11 is designed so that a flush battery top is provided even after the filler caps 20 have been inserted in the filler ports 19a–19f, whereby the battery 10 has a more aesthetic appearance and the filler caps are protected against damage. For this purpose, recesses 22a–22f are provided in the cover 11 coaxially with the filler ports 19a–19f which are adapted to receive the filler caps 20, the depth of each recess corresponding to or being greater than the composite height of the central portion 20b and the upper portions 20c and 20d of a filler cap. Accordingly, when the filler caps 20 have been threaded into the filler ports 19a–19f, the tops of the upper portions of the filler caps are flush with or below the upper surface of the cover 11 so that a flush battery top is provided.

As may be seen by reference to FIG. 3, the cells of the battery are separated and defined by parallel walls 24, the upper edge portions of which are in engagement with channels 25 defined by ribs 26 formed in the lower surface of the cover 11. Side walls and a bottom wall (not shown) define the remaining sides and bottoms of the cells, the upper edge portions of the side walls engaging channels in the cover 11. Preferably, the upper edge portions of the walls 24 and the free edges of side walls of the battery casing 12 are cemented in place within the channels of the cover 11 during assembly of the battery casing to prevent any leakage of electrolyte between adjacent cells or to the exterior of the battery. Each cell contains an electrode assembly having a pair of terminal posts 27 and 28. Adjacent terminal posts of adjacent cells are suitably connected together by, for example, an up-and-over internal connecting arrangement (not shown). Within the endmost cells, the terminal posts 16b and 16a are respectively connected to the terminal leads 18b and 18a.

In accordance with a principal aspect of the present invention, the cover 11 is provided with new and improved means for venting the cells of the battery 10. More specifically, the cover 11 is provided with a vent manifold which includes a plurality of venting cavities 30a–30f, one cavity communicating with each of the battery cells. For the purpose of venting the cells into the cavities 30a–30f, a pair of apertures or venting ports 31a and 31b are provided in the cover 11, below each of the cavities, which communicate with the associated cell.

In keeping with the principal aspect of the invention, vent cavities 30a–30f, associated with the respective cells of the battery, are interconnected in series by channels 35 formed by shallow grooves or notches disposed in the outer surface of the cover 11, the channels 35 being staggered relative to each other, as shown in FIG. 2. Thus, there is no straight line path through the cavities 30a–30f. The shape of each cavity 30a–30f and the staggered disposition of the channels 35 result in the elimination of any violent flow of fluid from one cavity to the next as well as within the vent tube 15. Especially in motorcycle applications, substantial surge forces, developing detrimental inertial movement of fluid in the manifold, have heretofore been experienced and such inertial action is greatly reduced by the use of the teachings of this invention. Furthermore, it is possible to employ somewhat shallower vent cavities without detrimental effects.

The open tops of the cavities 30a–30f are closed by the cover sheet 13 to define venting chambers for the cells. The sheet 13 is preferably in the form of a thin web of plastic material provided with a layer of pressure-sensitive adhesive or the like on one side. The sheet 13 and the pressure-sensitive adhesive should be acid resistant so that the cover sheet 13 adheres to the outer surfaces of the battery cover 11 surrounding the various recesses and apertures which are provided in the battery cover. To facilitate this, the upper surface of the cover member 11 is substantially flat. For the purpose of allowing the filler caps 20 to be inserted and removed subsequent to the application of the cover sheet 13 to the cover 11, a plurality of apertures 36a–36f are provided in the cover sheet which are coaxial with the recesses 22a in the cover and have substantially the same circular cross sections.

A substantial portion of the outer surface of cover 11 must be substantially coplanar to insure a good seal between the cover sheet 13 and the cover. Furthermore, a substantial land area in the outer plane should surround or define each cavity, channel, well, or other aperture or recess to insure the desired leakproof integrity.

In a preferred form thereof (see FIG. 3), the cover sheet 13 includes an inner cover sheet 13' which overlies the chambers 30a–30f and 38, the passageways 35 and the immediately adjacent cover area and an outer cover sheet 13'' which overlies substantially the entire outer surface of the cover member 11. The inner cover sheet 13' is preferably formed of polypropylene, high temperature polyvinyl chloride or polyester film. The thickness of the cover sheet 13' is preferably in the range of .002'' to .005'' when formed of polyester film and in the range of .005'' to .015'' when formed of polypropylene. The criteria for selecting the sheet 13' are that it must be acid resistant and must have sufficient body to resist puncture or deformation in use but should be sufficiently thin and flexible to be stored in roll form and to adhere to all of the appropriate cover surfaces with the application of hand pressure or equivalent. The materials selected are characterized by minimum shrinkage in use. Any appropriate adhesive may be employed but the preferred embodiment employs a pressure-sensitive adhesive. Any one of many adhesives which are normally tacky, pressure sensitive and acid resistant may be used and the coating may be in the order of 0.5 to 5 ounces per square yard. By employing an adhesive which remains tacky and plastic, the life and durability of the casing is enhanced as the cover resists damage from impact or the loosening of the sheet 13' from rapid temperature changes or dimensional changes of any kind. On the other hand, the outer cover sheet 13'' is preferably formed of paper or inexpensive plastic and provides a smooth, aesthetic appearance for the battery. Moreover, the outer cover sheet 13'' may be date stamped and coded with desired information, such as installation instructions. An appropriate adhesive is likewise employed with the outer sheet to secure it to the cover member 11.

While, in FIG. 3, the cover sheets 13' and 13'' are disclosed, it will be readily apparent the battery 10 may be provided with only the inner cover sheet 13'. In applications wherein an aesthetic appearance is required, the outer cover sheet 13'' may be added. Additionally, it will be readily apparent that a single cover sheet may be employed for covering substantially the entire outer surface of the cover member 11 which is formed in conformity with the above-described preferred specifications for the inner cover sheet 13' and may be date stamped and coded as the outer cover sheet 13''.

Adjacent one end of the battery, the endmost chamber 30a connects with a channel 38 which leads to a passageway 39. The passageway 39 is defined by a tubular coupling 40 extending vertically downward from the cover flange 11a. The tubular coupling 40, which is spaced from the wall of the flange 11a, is adapted to receive the vent tube 15 by slipping the end of the vent tube over the end of the coupling. The parts may be maintained in this position by friction, application of adhesive, clamps, or the like.

The tubular coupling 40 is formed integrally with the cover member 11. Any electrolyte or fumes which pass into the channel 38 and passageway 39 are discharged into tube 15, and the free end of the tube 15 is positioned in relation to the motorcycle or utilizing equipment and the operator thereof such that any such fluid or fumes discharged through the tube 15 will not harm either the motorcycle, equipment or the operator.

In further keeping with the principal aspect of the present invention, the bottom walls of the cavities 30a–30f slope downwardly from both sides toward the centers, as shown in FIG. 3. The aperture 31b is located substantially at the central portion of each cavity at the bottom of the well. On the other hand, the aperture 31a is located near one end of each cavity so that it is located higher on the sloping bottom. The apertures 31a and 31b communicate with the vapor space above the electrolyte in the cell, and permit the vapor generated during the use of the battery to be vented therefrom. The provision of two apertures for this purpose, in the positions described, function to prevent a vapor lock from occurring in the cell which might otherwise tend to retard return of any overflowing electrolyte to the cell. Any electrolyte which enters a cavity 30a–30f may drain back into the cell through the central aperture 31b, and the sloping condition of the bottom wall of the cavity and the upper aperture 31a facilitate such flow when the attitude of the battery is normal.

The channels 35 are relatively shallow and thus tend to prevent any electrolyte which may be sloshed into one of the cavities 30a–30f from passing to a connected cavity, and the staggered relationship of the interconnecting channels 35 also offers substantially increased resistance to the inertial flow of electrolyte between cavities. This increased resistance is effective to substantially prevent the escape of electrolyte from the battery through the successive cavities 30f–30a and channels 35 to the vent tube 15, although, as has been described above, any electrolyte which does traverse this tortuous path will be discharged from the end of the tube 15 in a location where it can do no harm.

Since the cover 11 is recessed to receive the cover sheet 13 and since the cover is also recessed to receive the filler caps 20 and the terminal leads 18a and 18b, it will be apparent that the assembled battery 10 has a flush top and has a more aesthetic appearance than present, conventional batteries.

What is claimed is:

1. A vent system for a storage battery having a casing body and a cover therefor, said body and cover defining at least one cell, said vent system comprising means defining a relatively large cavity in the outer surface of said cover, means defining a relatively small passageway between said cavity and the interior of said battery for venting said cell, means defining a relatively narrow and shallow fluid path in said outer surface extending from said cavity, and sheet means shaped to overlie at least a portion of the outer surface of said cover surrounding said cavity and path to close said cavity and path, said sheet means being adhesively secured to said cover to define a vent chamber and elongate vent path from the chamber to the atmosphere.

2. A vent system for a storage battery having a casing body defining a plurality of cells and a cover therefor, said vent system comprising means defining a relatively large cavity in the outer surface of said cover adjacent each of said cells, means defining a relatively small passageway between each cavity and the adjacent cell for venting said cell, means defining a relatively narrow and shallow fluid path in said outer surface extending from said cavity, and sheet means shaped to overlie at least a portion of the outer surface of said cover surrounding said cavity and path to close said cavities, said sheet means being adhesively secured to said cover to cooperate with said cavities and define vent chambers and an elongate vent path from the chambers to the atmosphere.

3. A vent system for a storage battery having a casing body and a cover therefor, said body and cover defining at least one cell, said vent system comprising means defining a relatively large cavity in the outer surface of said cover, means defining a relatively small passageway between said cavity and the interior of said battery for venting said cell, means defining a relatively narrow and shallow fluid path in said outer surface extending from said cavity, and sheet means shaped to overlie at least portion of the outer surface of said cover and close said cavity and said path, and a pressure-sensitive adhesive layer on said sheet means and securing said sheet means to said cover surrounding said cavity to define a vent chamber and elongate vent path from the chamber to the atmosphere.

4. A manifold vent system for a storage battery having a casing body dividing said battery into a plurality of cells and a cover for said body, said vent system comprising means defining a relatively large cavity in the outer surface of said cover adjacent each of said cells, means defining a relatively small passageway between each of said cavities and the adjacent cell for venting said cell, sheet means shaped to overlie at least a portion of the outer surface of said cover and close said cavities, a pressure-sensitive adhesive layer on said sheet means and securing said sheet means to said cover surrounding each of said cavities to define a plurality of vent chambers, means defining relatively narrow and shallow channels in the outer surface of said cover interconnecting said cavities, and means defining a channel in the outer surface of said cover interconnecting one of said cavities and the atmosphere, said sheet means being sealed to the outer surface of said cover about the means defining said channels to provide fluid paths.

5. A manifold vent system for a storage battery having a casing body dividing said battery into a plurality of cells and a cover for said body, said vent system comprising means defining a cavity in the outer surface of said cover adjacent each of said cells, means defining a passageway between each of said cavities and the adjacent cell, means defining channels in the outer surface of said cover interconnecting said cavities, means defining a channel in the outer surface of said cover interconnecting one of said cavities and the atmosphere, first sheet means shaped to overlie and close said cavities, said channels and the immediately adjacent cover area, second sheet means overlying substantially the entire outer surface of said cover and adapted to have desired information imprinted thereon, a pressure-sensitive adhesive layer on said sheet means and securing said sheet means to said cover.

6. A cover for a storage battery casing comprising a cover member having a plurality of cavities formed in the outer surface thereof, a plurality of channels in said outer surface interconnecting said cavities, and a sheet member overlying at least a portion of said outer surface to form chambers of said cavities and fluid paths of said channels.

7. The cover according to claim 6 wherein each of said cavities is provided with a pair of apertures communicating with the inner surface of said cover.

8. The cover according to claim 6 wherein the depth of said channels is less than the depth of said cavities.

9. The cover according to claim 6 wherein said channels are disposed in staggered relationship so that there is no straight line path through two of such channels and a connecting cavity.

10. The cover according to claim 6 wherein said sheet member comprises a sheet of high temperature vinyl from .002" to .015" thick.

11. The cover according to claim 6 wherein said sheet member comprises a sheet of polypropylene from .005" to .015" thick.

12. The cover according to claim 6 wherein said sheet member is of a copolymer plastic material and a pressure-sensitive, normally tacky layer is disposed on said sheet and secures said sheet to said cover to seal said chambers and said fluid paths.

13. The cover according to claim 6 wherein a plurality of recessed filler ports are provided which are adapted to receive filler caps so that a flush cover is provided even when the filler caps are in place.

14. The cover according to claim 6 wherein a plurality of filler ports are provided which are tapered outwardly from the top of the cover member to the bottom thereof and filler caps are removably disposed in said filler ports, the cross-sectional areas at the tops of the filler ports being less than the cross-sectional areas of the portions of the filler caps received thereby so that the filler caps are in sealing relationship with the ports.

15. The cover according to claim 6 wherein said sheet member comprises a sheet of polyester film from .002" to .005" thick.

16. A battery casing having a plurality of cells, said casing comprising a casing body having a plurality of walls defining said cells, a cover member joined with the free edge portions of said walls to substantially close said cells, said cover member having cavities formed in the outer surface thereof and aligned with said cells, the bottom wall of each of said cavities being dish-shaped and having a first aperture near the lowest portion of the bottom wall and a second aperture disposed at a higher level in said cavity, said first and second apertures communicating with the associated cell, a plurality of channels interconnecting said cavities, a sheet member overlying at least a portion of said cover member and adhesively secured thereto to form a chamber of each cavity, and a channel connecting one of said chambers with the atmosphere.

17. A battery casing comprising a casing body for defining a plurality of cells, a cover member closing said casing body, said cover member having a plurality of cavities in the outer surface thereof, each of said cavities having a sloping bottom wall, said bottom wall having a first aperture disposed at a lower portion and a second aperture disposed at an upper portion, a sheet member superimposed over at least a portion of said cover member to close each of said cavities, and an adhesive layer securing said sheet member to said cover member, said cover member having a plurality of channels adjacent said sheet member for interconnecting juxtaposed ones of said cavities, said channels being oriented along a pair of parallel lines and disposed in staggered relation with respect to each other, one of said channels opening to the atmosphere.

18. A storage battery comprising a casing having a bottom and side walls defining a plurality of cells; electrode assemblies having terminal posts, one assembly being disposed in each of said cells; a cover member having a pluarlity of cavities and a plurality of channels connecting said cavities all formed in the outer surface thereof, said cover member being secured to the free edge portions of said casing, each of said cavities including aperture means communicating with one of said cells; a sheet member shaped to overlie at least a portion of the outer surface of said cover; and a layer of normally tacky, pressure-sensitive adhesive on said sheet member, said adhesive securing said sheet member to said cover member whereby said cavities are covered and sealed to form vent chambers, said channels being covered by said cover member to define with said chambers a vent manifold.

19. The storage battery of claim 18 wherein a coupling is integrally formed in said cover member which is connected with one of said channels, said sheet member has a tab portion covering and sealing said coupling in fluid communication with said vent manifold, and tube means is secured to said coupling with its free end disposed remotely from said storage battery.

20. The storage battery of claim 18 wherein a plurality of recessed filler ports are provided in said cover which communicate with associated cells and a plurality of filler caps are removably disposed in the ports so that a flush cover is provided when the caps are in place, the cross-sectional areas at the tops of the ports being less than the cross-sectional areas of the portions of the caps received thereby so that the caps are in sealing relationship with the ports when received thereby.

(References on following page)

References Cited

UNITED STATES PATENTS

| | | | |
|---|---|---|---|
| 1,996,843 | 4/1935 | Meter | 136—177.3 X |
| 2,367,807 | 1/1945 | Smith | 136—177.1 |
| 2,848,527 | 8/1958 | Mocas | 136—177 |
| 2,890,262 | 6/1959 | Kendall et al. | |
| 3,083,256 | 3/1963 | Slautterback | 136—177 |

WINSTON A. DOUGLAS, *Primary Examiner.*

ALLEN B. CURTIS, *Examiner.*

D. L. WALTON, *Assistant Examiner.*